United States Patent Office.

FRANCIS C. RENNER, OF LADIESBURG, MARYLAND.

Letters Patent No. 61,870, dated February 5, 1867.

IMPROVED FERTILIZER.

*The Schedule referred to in these Letters Patent and making part of the same.*

TO ALL WHOM IT MAY CONCERN:

Be it known that I, FRANCIS C. RENNER, of the county of Frederick, and State of Maryland, have invented a new and improved fertilizer, known as "Renner's Chemical Fertilizer;" and I do hereby declare that the following is a full and exact description thereof.

I weigh out about sixteen hundred pounds of rich earth or soil, which is spread out on a floor or some suitable place for mixing; I then add to the soil one hundred pounds of saltpetre, and mix well; to this I add about two hundred pounds of sulphate of ammonia, and again mix thoroughly; I next add about one hundred pounds of the flour of raw bone, and again mix well, when the compound is thrown into garners, where it is allowed to remain until the whole mass goes through a "sweat." It is then barrelled and ready for use.

What I claim as my invention, and desire to secure by Letters Patent, is—

The combination of the several ingredients, as previously described, (or in any manner substantially the same,) and for the purposes set forth, the effect of which is to furnish a cheap fertilizer, and at the same time one which may be economically used, and yet supply the soil with the largest amount of ammonia.

FRANCIS C. RENNER.

Witnesses:
BENJAMIN SMITH,
WILFORD A. RENNER.